April 11, 1961 F. E. BLOUNT ET AL 2,979,389
APPARATUS FOR TREATING HIGH PRESSURE GAS SYSTEMS
Filed April 18, 1957
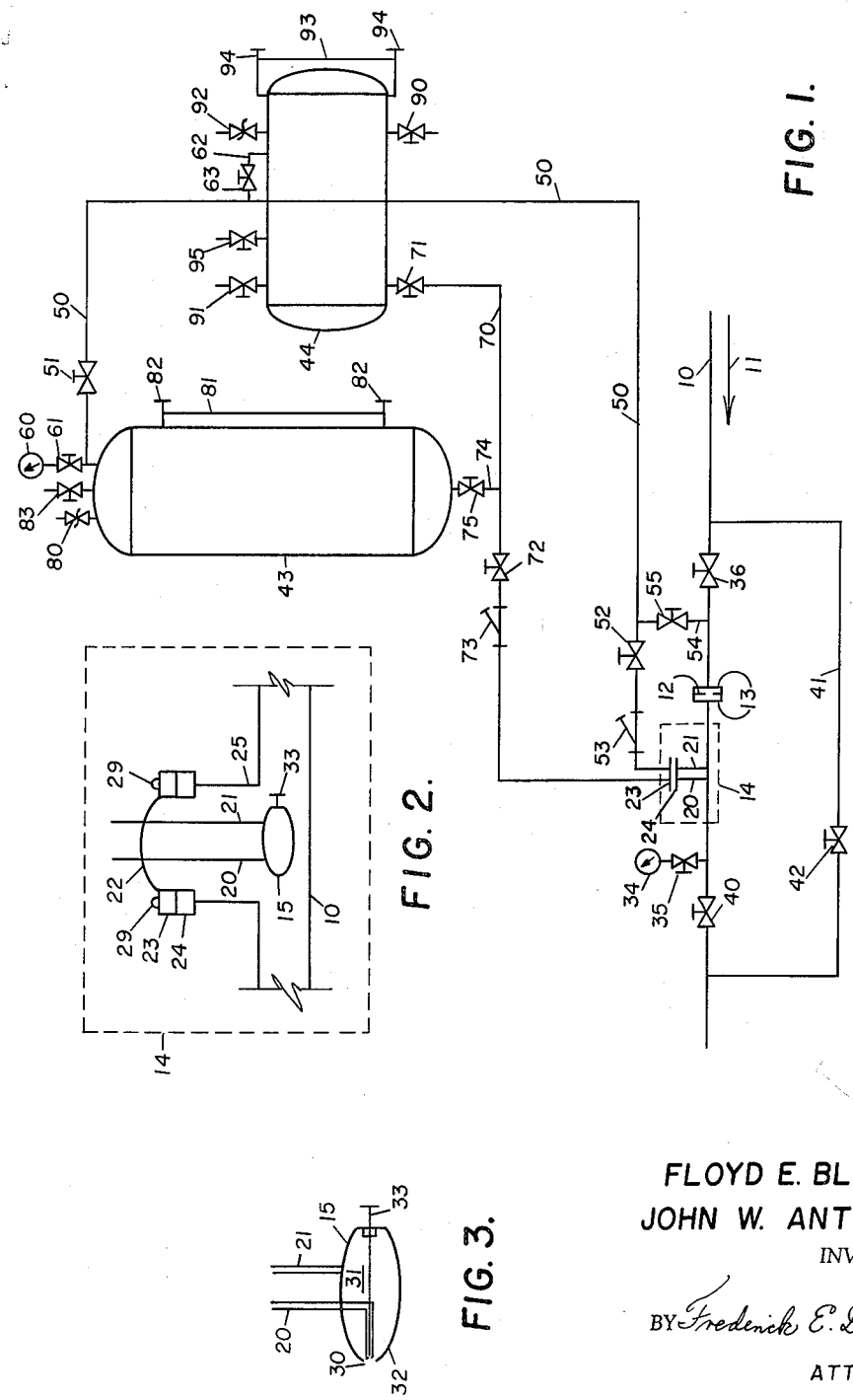
FLOYD E. BLOUNT
JOHN W. ANTHONY
INVENTOR.
BY Frederick E. Dumoulin
ATTORNEY United States Patent Office 2,979,389
Patented Apr. 11, 1961

2,979,389

APPARATUS FOR TREATING HIGH PRESSURE GAS SYSTEMS

Floyd E. Blount and John W. Anthony, Dallas, Tex., assignors, by mesne assignments, to Socony Mobil Oil Company, Inc., New York, N.Y., a corporation of New York Filed Apr. 18, 1957, Ser. No. 653,682

6 Claims. (Cl. 48—195)

This invention generally relates to the treatment of gas systems and more particularly relates to apparatus for injecting treating agents in the form of a vapor or mist into high pressure gas systems.

In the operation of high pressure gas systems, such as gas transmission lines and gas systems used for lifting fluids from oil wells, conditions are frequently encountered which necessitate the employment of treating agents in order to preserve better the equipment used and to operate more efficiently the systems. Among these conditions are the use of odorless gas, the use of gas which requires humidification, the use of gas which corrodes the lines and associated equipment, the use of gas which causes the formation of solid hydrates, and others.

Some gas systems are used for the conveyance of odorless gas for fuel and illuminating purposes. Leaks in such systems can readily create dangerous situations, such as a poisonous atmosphere which can easily cause death by asphyxiation and atmospheres which are susceptible to explosion. In order to prevent the eventualities inherent in the use of odorless gas, it is necessary to inject into such systems an odorizing agent.

Gas systems which are carrying extremely dry gas and have previously carried wet and possibly corrosive gas are susceptible to problems created by the breaking loose of rust and other forms of corroded materials. These materials which break loose are carried by the dry gas to clog valves and pumps and cause other forms of damage. It is necessary in systems such as this to inject a humidifying agent. It might also be desirable in systems carrying dry gas to inject a lubricating agent which will tend to prevent the breaking away of corroded materials which might become entrained in the flowing gas.

A system carrying gas of a corrosive nature requires the injection of inhibitors which will fall out at points along the system to inhibit corrosion.

Most generally in the situations discussed above which call for the injection of treating agents into gas systems, it is preferable that the treating agent employed be injected in the form of a mist or vapor, at a continuous rate, and at a rate which is proportional to the rate of flow of the gas within the systems.

In instances where the gas being moved is highly explosive, it is preferable that the apparatus employed for injecting treating agents be actuated in a manner that will minimize the probability of ignition of gas which may leak in the vicinity of the injection apparatus. Obviously, therefore, it is not safe to use injection apparatus powered by electric motors, internal combustion engines, or any other power source which might possibly ignite leaking gas.

It is an object of the present invention to provide apparatus for injecting treating agents into high pressure gas systems. It is another object of the invention to provide injection apparatus which may be operated on a continuous basis and which will inject treating agents at a rate proportional to the flow of gases in the gas systems in which the apparatus is employed. It is a further object of the invention to provide apparatus for injecting treating agents in the form of a vapor or mist into high pressure gas systems. These and additional objects of the invention will be evident from a reading of the following specification and accompanying drawings.

In the drawings, Fig. 1 is a schematic diagram of one embodiment of the invention. Fig. 2 is a schematic diagram of an injection unit which may be employed in the embodiment of the invention illustrated in Fig. 1. Fig. 3 is an enlarged sectional view of an atomizer which may be used in the injection unit of Fig. 2.

Referring to the drawings, reference numeral 10 designates a high pressure gas line. The direction of flow of gas within line 10 is illustrated by the arrow at 11. Positioned in line 10 is an orifice plate 12 which is maintained in position by means of flange 13.

The size of the orifice in plate 12 is determined by the amount of gas flowing in the system, the pressure of the gas, and the pressure drop desired across the orifice plate. The apparatus is operable in any gas system which can tolerate a pressure drop across orifice plate 12 ranging from a minimum of approximately 10 pounds per square inch to approximately 50 pounds per square inch. Orifice plate 12 is preferably designed to effect a pressure drop ranging from about 10 pounds per square inch to about 20 pounds per square inch, though the upper limit may go as high as 50 pounds per square inch.

Secured into line 10 on the downstream side of orifice plate 12 is an injection unit 14. Details of the injection unit are shown in Figs. 2 and 3. Injection unit 14 comprises an atomizer 15, liquid supply line 20, gas supply line 21, cap 22, flange 23, flange 24, and body 25. Flange 24 is secured to body 25 which in turn is welded into line 10. Cap 22 is welded to flange 23 which is secured to flange 24 by means of bolts 29. Such arrangement permits the atomizer to be readily inserted into and removed from line 10.

Atomizer 15 is an external-mix-type nozzle into which both gas and liquid are fed under pressure. Liquid enters the atomizer through line 20 and flows through an orifice 30 provided in the end of line 20. Gas enters the atomizer through line 21, flows through annulus 31, which is provided between atomizer body 32 and line 20, and flows out of the atomizer around orifice 30 where the liquid and gas join to form a vapor. The flow of liquid through orifice 30 is controlled by means of needle valve 33.

It is not intended to restrict the design of atomizer 15 to that described and shown in Fig. 2. Any type nozzle which will efficiently vaporize liquid at the operating pressures available will be satisfactory.

Positioned adjacent to injection unit 14 and connected into line 10 is a pressure gauge 34 which is used to indicate approximately the pressure of the gas at the injection unit. Pressure to gauge 34 may be cut off by valve 35 which is secured between gauge 34 and line 10.

In high pressure gas systems it has been found that the minimum pressure on the downstream side of an orifice, such as the orifice in orifice plate 12, will occur immediately adjacent the orifice plate. As the distance increases on the downstream side from the orifice plate, the pressure increases and eventually approaches a point, i.e., the recovery point, at which it will be approximately equal to the pressure on the upstream side of the orifice plate. In view of the fact that the energy required to operate the apparatus is provided by the pressure differential across the orifice plate 12, it is, therefore, desirable that the distance between atomizer 15 and orifice plate 12 be maintained at a minimum in order that the pressure available at the atomizer will be at a maximum. It is preferable to maintain this distance between orifice plate 12 and atomizer 15 no greater than about 3 to 4 feet.

Valve 36 is positioned in line 10 upstream from orifice plate 12 and valve 40 is positioned in line 10 downstream from injection unit 14. When the apparatus is in operation, valves 36 and 40 remain open. At times when, for various reasons, it may be necessary or desired to isolate orifice plate 12 and injection unit 14 from the system, valves 36 and 40 may be closed. To provide for uninterrupted flow of gas through the system when valves 36 and 40 are closed, bypass line 41 containing valve 42 is connected into line 10 between a point upstream from valve 36 and a point downstream from valve 40.

Feed tank 43 and storage tank 44 are provided to maintain a supply of treating agent for the system. Though tank 43 is shown in a vertical position and tank 44 is shown in a horizontal position, it will be understood that these positions of the tanks are not critical and they may be placed in any positions desired or dictated by the circumstances. It has been found, however, that the vertical position for the feed tank is preferable inasmuch as a smaller, horizontal, cross-sectional area permits a more accurate measurement of the change of level of liquid within the tank and rate of flow into and from the tank.

Conduit 50 extends from tank 43 to gas supply line 21 in injection unit 14. Conduit 50 is provided with valve 51, valve 52, and filter unit 53. A conduit 54 is connected from conduit 50 into line 10 between valve 36 and orifice plate 12. Conduit 54 is provided with a valve 55. Pressure gauge 60 is connected into conduit 50 at a point in conduit 50 adjacent to tank 43. A valve 61 is positioned between gauge 60 and conduit 50 so that the gauge may be isolated from the gas pressure in conduit 50 for purposes of adjustment and repair of the gauge. A line 62 provided with a valve 63 leads from conduit 50 into storage tank 44.

Injection unit 14 is provided with gas from line 10 upstream from orifice 12 by means of conduits 50 and 54. Conduits 50 and 54 also serve to connect the top of tank 43 with line 10 upstream from orifice plate 12. Thus, conduits 50 and 54 function to provide gas pressure to both tanks 43 and 44 and atomizer 15. It will be readily recognized that the atomizer and the tanks may be provided with gas under pressure by separate conduits from line 10 upstream from orifice plate 12.

A conduit 70 extends from tank 44 to liquid supply line 20 in injection unit 14. Conduit 70 is provided with valve 71, valve 72, and filter unit 73. Leading from conduit 70 into feed tank 43 is a line 74 provided with a valve 75. Conduit 70 and line 74 function to supply treating agent to the atomizer from either or both the feed and storage tanks. Conduit 70 and line 74 also permit the transfer of treating agent from tank 44 into tank 43.

Filters 53 and 73 are conventional in design and function to remove solid matter from the gas and the treating agent to prevent clogging of the atomizer. These filters may employ wire mesh as the filtering agent.

Liquid feed tank 43 is provided with a pressure relief valve 80 which is adapted to open in the event excessive pressure develops within the feed tank. Valve 80 may be set to relieve tank 43 at any desired predetermined pressure. In order that the level and the rate of change of the level of liquid within the feed tank may be determined, a sight gauge 81 is connected to the tank. Valves 82 are secured on either side of the sight gauge between the sight gauge and the tank to permit the gauge to be isolated from the tank for purposes of adjustment and repair. A bleed valve 83 is provided in the upper end of the feed tank to permit gas to be bled from the tank for purposes which will be explained hereinafter.

Storage tank 44 is provided with a drain valve 90. Mounted on the top of tank 44 are valves 91 and 92.

Valve 91 is a conventional type bleed valve used to permit the escape of gas from the tank during filling. Valve 92 is a pressure relief valve which is set to open at any desired predetermined pressure. A sight glass 93 provided with valves 94 is connected to tank 44. Valves 94 may be closed at times when it is necessary to adjust or repair the sight glass. Tank 44 is also provided with a fill valve 95.

It is preferred that the apparatus include, as described, liquid feed tank 43 and liquid storage tank 44. However, a single tank may be employed in lieu of the feed and storage tanks as shown. The disadvantage of utilizing a single tank is the fact that it is necessary to interrupt the operation of the apparatus in order to refill the tank with treating agent. The use of a feed tank and a separate storage tank permits the continuous operation of the apparatus, as the feed tank may be refilled from the storage tank without interrupting the operation of the apparatus, and the storage tank may then be refilled as needed or desired. The method of carrying out this procedure will be described hereinafter.

Prior to placing the apparatus in operation, it is necessary that atomizer 15 be adjusted to provide the desired rate of flow of treating agent into line 10. With gas in the system flowing through line 10, the pressure drop across orifice plate 12 is first determined. Valves 36 and 40 are closed and valve 42 is opened in order to isolate injection unit 14 from the system and to permit the gas in the system to continue to flow through bypass line 41. Atomizer 15 and its associated parts are removed from the injection unit by loosening and removing bolts 29. Tanks 43 and 44 are filled with the liquid treating agent to be injected into the system. Valves 51, 63, 55, and 71 are closed. Valves 52, 72, and 75 are opened. A cylinder of compressed gas, not shown, is connected by means of temporary lines to the top of feed tank 43 and to conduit 50, thus providing gas pressure into gas supply line 21 and into the feed tank. The pressure from the cylinder of compressed gas is adjusted until it is equal to the pressure drop across orifice plate 12 as previously determined. Atomizer 15 is permitted to spray into the air and needle valve 33 is adjusted until the rate of feed of treating agent through the atomizer is approximately ten percent in excess of the desired rate. The rate of feed of the treating agent is determined by observation of the change of level of treating agent within feed tank 43 as indicated by gauge 81. Once the desired rate of flow of treating agent through atomizer 15 has been established, the compressed gas cylinder and temporary connecting lines are removed and atomizer 15 is reassembled in injection unit 14. Final adjustment of the rate of feed of the treating agent is accomplished by manipulation of valve 72 after the apparatus is in operation.

The injection apparatus may now be placed in operation. Valves 36 and 40 are opened to permit gas in line 10 to flow through the orifice plate 12 and around atomizer 15. Valve 42 in bypass line 41 is closed. Valves 51, 52, and 55 remain open and valve 63 closed. Thus, gas in line 10 on the upstream side of orifice plate 12 flows through conduit 54 into conduit 50 and through conduit 50 to gas supply line 21 in injection unit 14 and to the top of feed tank 43. This provides atomizer 15 with a supply of gas under pressure and provides the feed tank with the necessary gas pressure to force the liquid treating agent from the feed tank. Valve 71 is closed and valves 72 and 75 are opened, thus permitting the liquid treating agent to flow from feed tank 43 through line 74 into conduit 70 and, subsequently, into liquid supply line 20 to provide the atomizer with treating agent. If it should be desired, the atomizer may be fed simultaneously from both the feed tank and the storage tank by opening valves 63 and 71. With these valves open, the gas pressure in conduit 50 is also exerted upon the treating agent within tank 44 in order to force it out through line 70 where it joins the treating agent flowing from tank 43 and passes on to the atomizer.

It is generally preferred that the treating agent be supplied from feed tank 43 while maintaining storage tank 44 as a replacement supply which may be transferred to tank 43 without interruption of injection of the treating agent into line 10. The transfer of the treating agent from storage tank 44 into feed tank 43 is accomplished in the following manner. Valves 63 and 71 are opened. Valve 51 is closed in order that the pressure of the gas within conduit 50 will be exerted upon the treating agent within tank 44. Valve 83 in the top of feed tank 43 is opened slightly to permit treating agent from tank 44 to flow through conduit 70 and line 74 into tank 43. The purpose of opening valve 83 at this point is to relieve the pressure within tank 43 sufficiently to permit the flow of treating agent into the tank. In view of the fact that the gas pressure within line 10 may be high, care must be taken in manipulating valve 83 to insure that it is not opened to such an extent that the treating agent will be blown out of the system through the valve. Valve 83 is maintained in an open position until treating agent rises to the desired level in tank 43. During the transfer of treating agent from the storage tank to the feed tank, the storage tank functions as the supply source for both the atomizer and the feed tank. Once the desired amount of treating agent from the storage tank has been transferred into the feed tank, valves 63 and 71 are closed and valve 51 is opened to permit the gas pressure within conduit 50 to once again be exerted on the treating agent within feed tank 43 in order to supply the atomizer from tank 43. Storage tank 44 may be refilled when desired.

It can be readily seen from the above description that the apparatus of the invention requires a minimum of service and maintenance which particularly adapts it for use in remote locations in gas transmission lines where frequent attention by personnel is not practicable.

Having thus described our invention, it will be understood that such description has been given by way of illustration and example and not by way of limitation, reference for the latter purpose being had to the appended claims.

We claim:

1. In apparatus for injecting liquid in mist form into a high pressure gas line, the combination of a restriction in said high pressure gas line to effect a pressure differential in said line, an atomizer positioned in said high pressure gas line on the downstream side of said restriction, liquid feed tank means, supply gas conduit means leading from said high pressure gas line upstream from said restriction to said tank means and to said atomizer for introducing supply gas directly into said atomizer by the pressure within said high pressure gas line upstream from said restriction, and a liquid supply conduit leading from said tank means to said atomizer to permit forcing liquid into said atomizer by the pressure within said high pressure gas line upstream from said restriction.

2. In apparatus for injecting liquid in mist form into a high pressure gas line, the combination of a restriction in said high pressure gas line to effect a pressure differential in said line, an atomizer positioned in said high pressure gas line on the downstream side of said restriction, a supply gas conduit leading to said atomizer from said high pressure gas line upstream from said restriction whereby supply gas may be forced directly into said atomizer by the pressure within said high pressure gas line upstream from said restriction, liquid feed tank means, a supply gas conduit leading from said high pressure gas line upstream from said restriction to said liquid feed tank means and liquid supply conduit means leading from said liquid feed tank means to said atomizer to permit forcing liquid into said atomizer by the pressure within said high pressure gas line upstream from said restriction.

3. In apparatus for injecting liquid in mist form into a high pressure gas line, the combination of a restriction in said high pressure gas line to effect a pressure differential in said line, an atomizer positioned in said high pressure gas line on the downstream side of said restriction, a first valve in said high pressure gas line upstream from said restriction, a second valve in said high pressure gas line downstream from said atomizer, a bypass line connected to said high pressure gas line extending from upstream of said first valve to downstream of said second valve, a valve in said bypass line, a supply gas conduit leading to said atomizer from said high pressure gas line upstream from said restriction whereby supply gas may be forced directly into said atomizer by the pressure within said high pressure gas line upstream from said restriction, liquid feed tank means, a supply gas conduit leading to said tank means from said high pressure gas line upstream from said restriction, and a liquid supply conduit leading from said tank means to said atomizer to permit forcing liquid into said atomizer by the pressure within said high pressure gas line upstream from said restriction.

4. In apparatus for injecting liquid in mist form into a high pressure gas line, the combination of a restriction in said high pressure gas line to effect a pressure differential in said line, an atomizer positioned in said high pressure gas line on the downstream side of said restriction, a first valve in said high pressure gas line upstream from said restriction, a second valve in said high pressure gas line downstream from said atomizer, a bypass line connected to said high pressure gas line extending from upstream of said first valve to downstream of said second valve, a valve in said bypass line, a supply gas conduit leading to said atomizer from said high pressure gas line upstream from said restriction whereby supply gas may be forced directly into said atomizer by the pressure within said high pressure gas line upstream from said restriction, liquid feed tank means, liquid storage tank means, supply gas conduit means leading to said feed tank and said storage tank means from said high pressure gas line upstream from said restriction, and liquid supply conduit means leading from said feed tank and said storage tank means to said atomizer to permit forcing liquid into said atomizer by the pressure within said high pressure gas line upstream from said restriction.

5. In apparatus for injecting liquid in mist form into a high pressure gas line, the combination of a restriction in said high pressure gas line to effect a pressure differential in said line, an atomizer positioned in said high pressure gas line downstream from said restriction, a first valve in said high pressure gas line upstream from said restriction, a second valve in said high pressure gas line downstream from said atomizer, a bypass line connected to said high pressure gas line extending from upstream of said first valve to downstream of said second valve, a valve in said bypass line, a liquid feed tank provided with a relief valve, a bleed valve, and a sight gauge, a liquid storage tank provided with a relief valve, a bleed valve, a sight gauge, and a drain valve, supply gas conduit means leading from said high pressure gas line between said first valve and said restriction to said tanks and to said atomizer whereby supply gas may be forced directly into said atomizer by the pressure within said high pressure gas line upstream from said restriction, a filter in said supply gas conduit means, valve means in said supply gas conduit means adapted to permit selective control of flow of supply gas from said high pressure gas line to said atomizer and said tanks, liquid supply conduit means leading between said tanks and said atomizer to permit forcing liquid into said atomizer by the pressure within said high pressure gas line upstream from said restriction, a filter in said liquid supply conduit means, and valve means in said liquid supply conduit means adapted to permit selective control of flow of liquid between said tanks and said atomizer.

6. In apparatus for injecting liquid in mist form into a high pressure gas line, the combination of an orifice-plate-type restriction in said high pressure gas line to effect a pressure differential in said line, an external-mix-type atomizer positioned in said high pressure gas line downstream from said restriction, a first valve in said high pressure gas line upstream from said restriction, a second valve in said high pressure gas line downstream from said atomizer, a bypass line connected to said high pressure gas line extending from upstream of said first valve to downstream of said second valve, a valve in said bypass line, a liquid feed tank provided with a relief valve, a bleed valve, and a sight gauge, a liquid storage tank provided with a relief valve, a bleed valve, a sight gauge, and a drain valve, supply gas conduit means leading from said high pressure gas line between said first valve and said restriction to each of said tanks and to said atomizer whereby supply gas may be forced directly into said atomizer by the pressure within said high pressure gas line upstream from said restriction, a filter in said supply gas conduit means, valve means in said supply gas conduit means adapted to permit selective control of flow of supply gas from said high pressure gas line to each of said tanks and to said atomizer, liquid supply conduit means leading between said tanks and from said tanks to said atomizer to permit forcing liquid into said atomizer by the pressure within said high pressure gas line upstream from said restriction, a filter in said liquid supply gas conduit means, and valve means in said liquid supply conduit means adapted to permit selective control of flow of liquid between said tanks and to said atomizer.

References Cited in the file of this patent
UNITED STATES PATENTS

| | | |
|---|---|---|
| 1,878,174 | Oberfell | Sept. 20, 1932 |
| 2,261,590 | Rutherford | Nov. 4, 1941 |
| 2,266,981 | Miller | Dec. 23, 1941 |
| 2,399,723 | Crowther | May 7, 1946 |
| 2,754,184 | Linn | July 10, 1956 |

OTHER REFERENCES

Senatoroff: American Gas Association Proceedings, 1950, pp. 685–690.

Perry: "Chemical Engineers' Handbook," 3rd Ed., 1950, pp. 1203.

Gas Age Record, November 20, 1930, vol. 66, No. 20, pp. 859–864.

UNITED STATES PATENT OFFICE

CERTIFICATION OF CORRECTION

Patent No. 2,979,389                      April 11, 1961

Floyd E. Blount et al.

It is hereby certified that error appears in the above numbered patent requiring correction and that the said Letters Patent should read as corrected below.

Column 2, line 16, for "flange" read -- flanges --; column 8, line 21, list of references cited, under the heading "OTHER REFERENCES" for "November 20, 1930" read -- November 29, 1930 --.

Signed and sealed this 5th day of September 1961.

(SEAL)
Attest:

ERNEST W. SWIDER

Attesting Officer

DAVID L. LADD

Commissioner of Patents